July 24, 1923.
A. SCHMIDT
DOORCHECK
Filed Feb. 1, 1922
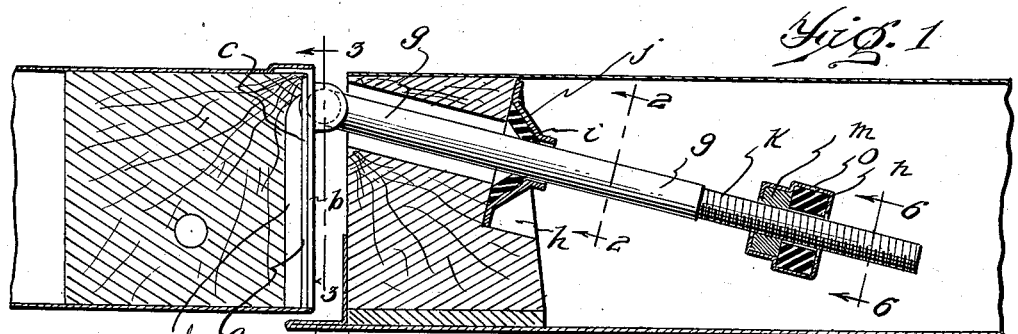
Fig. 1
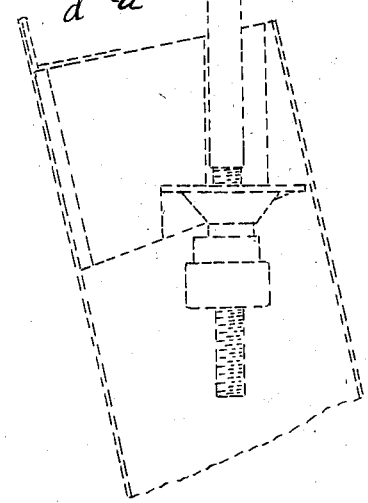
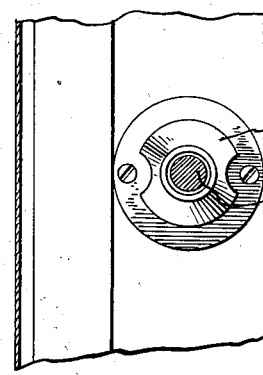
Fig. 2
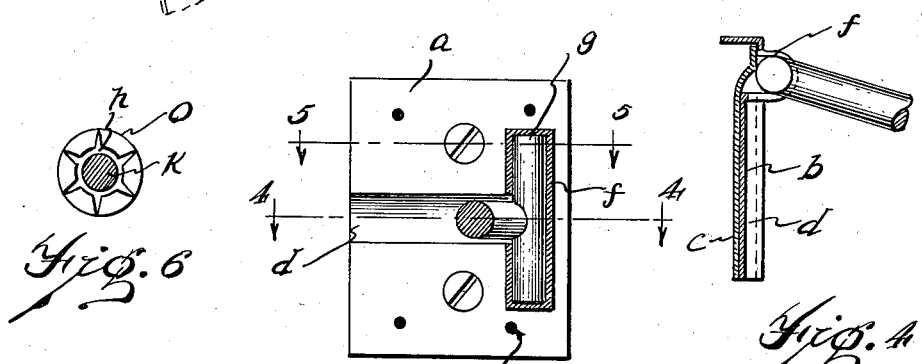
Fig. 6  Fig. 3  Fig. 4
Fig. 5
Inventor
Albert Schmidt
By Stuart C Barnes
Attorney Patented July 24, 1923.

1,462,872

UNITED STATES PATENT OFFICE.

ALBERT SCHMIDT, OF DETROIT, MICHIGAN, ASSIGNOR TO FISHER BODY CORPORATION, OF DETROIT, MICHIGAN, A CORPORATION OF NEW YORK.

DOORCHECK.

Application filed February 1, 1922. Serial No. 533,296.

*To all whom it may concern:*

Be it known that I, ALBERT SCHMIDT, a citizen of the United States, residing at Detroit, in the county of Wayne and State of Michigan, have invented certain new and useful Improvements in Doorchecks, of which the following is a specification.

This invention relates to door checks, and especially door checks intended for automobile doors. It has for its object a door check which is completely concealed when the door is closed and which can be made at a minimum cost.

In the drawings,—

Fig. 1 is a cross section through a part of the door and the door post showing the door in dotted lines in its outward position.

Fig. 2 is a section on the line 2—2 of Fig. 1.

Fig. 3 is a section on the line 3—3 of Fig. 1.

Fig. 4 is a cross section on the line 4—4 of Fig. 3.

Fig. 5 is a cross section on the line 5—5 of Fig. 3.

Fig. 6 is a cross section taken on the line 6—6 of Fig. 1.

The concealed door check comprises a post fixture $a$ made up of two plates $b$ and $c$ which are spot-welded together. Both these plates are stampings and both are grooved with a horizontal groove $d$. The vertical groove $f$ is made in the plate $b$ but it does not extend clear to the top and bottom but is simply the length of the head of the T-bolt $g$. The T-bolt head is placed in this vertical groove which forms a knuckle. The groove $d$ is intended to receive the stem of the T-bolt when the door is swung outwardly, as shown in the dotted lines of Fig. 1.

It will be understood that the T-bolt is assembled into the post fixture $a$ by placing the head of the T-bolt in the loop $f$ or knuckle $f$ and spot-welding the two plates together. This permanently fastens the rod-like check member to the post fixture.

The stile of the door has an oblique counterbore $h$ cut in the inside face of the stile or post. To this is adapted to be secured the door fixture $j$, simply an escutcheon-like member formed as a stamping. This escutcheon-like member houses a conical rubber washer $i$ which fits tightly around the stem of the T-bolt $g$ so that this bolt or checking member cannot chatter by striking the opening in the escutcheon-like member $j$.

The end of the T-bolt is threaded as at $k$. A nut $m$ screws onto the threads on the end of the T-bolt or checking element. This nut together with the rubber washer $n$ is encased in a stamped metal shell $o$. The washer acts as a lock nut and the complete nut assembly acts as an adjustable abutment to strike the post fixture. The position of this abutment upon the stem of the T-bolt regulates the effective length of the checking element.

By locating the post fixture on the inside of the door stile or post, the entire strength of the stile or post resists the checking action and the fixture is not liable to be torn out of the stile or post by the loosening of the screws. Furthermore, this arrangement completely conceals the fixture on the door.

Further, this check may be used on any door regardless of thickness or width of stiles or door posts and regardless of what type of hinge is attached. The proper adjustment of the door for the desired opening will be made by reaching through the door-pocket or under the edge of the trimming.

What I claim is:

1. A door check, comprising a post fixture which consists of two plates secured together, one of the plates provided with a loop formation forming a knuckle, a T-bolt having a head portion secured in the knuckle when the said two plates of the fixture are secured together, a door fixture through which the stem of the T-bolt slidably engages, and an abutment on the end of the T-bolt for striking the door fixture.

2. In a door check, the combination of a post fixture having a plate provided with a loop-like portion forming a knuckle and having a horizontal groove leading from the outside of the plate to the said knuckle, a T-bolt having its head secured in said knuckle and having the stem portion adapted to drop into the groove in the fixture when the door opens wide, a door fixture through which the stem of the T slidably engages, and an abutment on the end of the T-bolt stem for engaging said door fixture.

3. In a door check, the combination with a stile or post having an opening therethrough of a post fixture, a checking element pivotally secured in said post fixture, and a door fixture securable to the inner face of the stile or post, an abutment on the end of the checking element, the said checking element passing through the door fixture and arranged also to pass through said opening in the stile, said abutment arranged to engage against the door fixture to stop the door in its outward movement.

4. A door check, having in combination with a stile provided with an opening therethrough, a post fixture, a checking element in the form of a rod-like member pivotally supported in the post fixture, an abutment on the end of the rod-like member, and a door fixture in the form of an escutcheon-like member through which the rod-like member slides and which is fastened to the inner face of the stile or post of the door while the rod-like checking member passes through said opening in the stile or post.

5. A door check, having in combination, a post fixture, a rod-like checking element pivotally supported in the post fixture, a door fixture through which the rod-like checking element slidably but loosely engages, a rubber washer secured in the door fixture for engaging the rod-like checking element securely to prevent chattering between the checking element and the door fixture, and an abutment on the end of the checking element arranged to engage the door fixture.

6. A door check, having in combination, a post fixture comprising a pair of plates, the front one of which is provided with a loop-like formation forming a knuckle and both of which are provided with a horizontal groove leading from the knuckle to the outside of the plates, a T-like bolt having its head secured in the knuckle when the two plates are fastened together and having the stem portion adapted to swing in the horizontal groove when the door swings outwardly, and a door fixture through which the stem of the T-bolt is slidable, and an abutment on the end of the stem of the T adapted to engage a portion of the door fixture to stop the same.

In testimony whereof I affix my signature.

ALBERT SCHMIDT.